(12) United States Patent
Stirling-Gallacher et al.

(10) Patent No.: US 8,442,443 B2
(45) Date of Patent: May 14, 2013

(54) BEAM SELECTION METHOD

(75) Inventors: Richard Stirling-Gallacher, Stuttgart (DE); Juán Nogueira-Nine, Stuttgart (DE)

(73) Assignee: Sony Corporation, Tokyo (JP)

( * ) Notice: Subject to any disclaimer, the term of this patent is extended or adjusted under 35 U.S.C. 154(b) by 708 days.

(21) Appl. No.: 12/652,184

(22) Filed: Jan. 5, 2010

(65) Prior Publication Data

US 2010/0210219 A1   Aug. 19, 2010

(30) Foreign Application Priority Data

Feb. 17, 2009  (EP) .................................... 09153009

(51) Int. Cl.
*H04B 1/00* (2006.01)

(52) U.S. Cl.
USPC ............. 455/63.1; 455/60; 455/63.4; 455/65; 455/67.14; 455/67.15; 455/67.16

(58) Field of Classification Search .................... 455/60, 455/63.1, 63.4, 65, 67.14, 67.15, 67.16
See application file for complete search history.

(56) References Cited

U.S. PATENT DOCUMENTS

| | | | |
|---|---|---|---|
| 6,888,501 B2 | 5/2005 | Hirayama et al. | |
| 6,965,762 B2 * | 11/2005 | Sugar et al. | 455/276.1 |
| 8,249,513 B2 * | 8/2012 | Niu et al. | 455/63.4 |
| 2001/0049295 A1 | 12/2001 | Matsuoka et al. | |
| 2002/0102950 A1 * | 8/2002 | Gore et al. | 455/101 |
| 2007/0205943 A1 | 9/2007 | Nassiri-Toussi et al. | |
| 2007/0280367 A1 | 12/2007 | Nakao et al. | |
| 2010/0009635 A1 * | 1/2010 | Qin et al. | 455/63.4 |

FOREIGN PATENT DOCUMENTS

| | | | |
|---|---|---|---|
| EP | 1 659 813 A1 | 5/2006 | |
| EP | 1 843 485 A1 | 10/2007 | |
| EP | 1 892 852 A1 | 2/2008 | |

OTHER PUBLICATIONS

Junyi Wang et al., "Robust and Highly Efficient Beamforming Procedures for 60GHz WPAN—Beam-Searching—Tracking", Project: IEEE P802.15 Working Group for Wireless Personal Area Networks (WPANs), doc.: IEEE 802.15-08-0190-00-3c, Mar. 2008, 12 pages.
Ismail Lakkis et al., "mm Wave Multi-Resolution Beamforming", Project: IEEE P802.15 Working Group for Wireless Personal Area Networks (WPANs), doc.: IEEE 802.15-08-0182-00-003c, Mar. 19, 2008, 39 pages.
Ismail Lakkis et al., "Beamforming", Project: IEEE P802.15 Working Group for Wireless Personal Area Networks (WPANs), Doc.: 15-08-0361-00-003c, May 14, 2008, 46 pages.
Ismail Lakkis et al., "mm Wave Beamforming", Project: IEEE P802.15 Working Group for Wireless Personal Area Networks (WPANs), doc.: IEEE 802.15-08-0055-01-003c, Jan. 15, 2008, 64 pages.
Gordon L. Stueber, et al., "Broadband MIMO-OFDM Wireless Communications", pp. 1-21.

* cited by examiner

*Primary Examiner* — Wen Huang
(74) *Attorney, Agent, or Firm* — Oblon, Spivak, McClelland, Maier & Neustadt, L.L.P.

(57) ABSTRACT

The present invention relates to a method which analysis the characteristics of the received signal and selects the best beam arrangement for a transmitter/receiver pair for a given situation in a communication system. In particular, the channel delay profile provides characteristics which help to determine and evaluate the quality of a signal link. The result of this evaluation is used for selecting the best beam arrangement.

15 Claims, 5 Drawing Sheets

BEAM SELECTION METHOD

FIELD OF THE INVENTION

Figure 1:
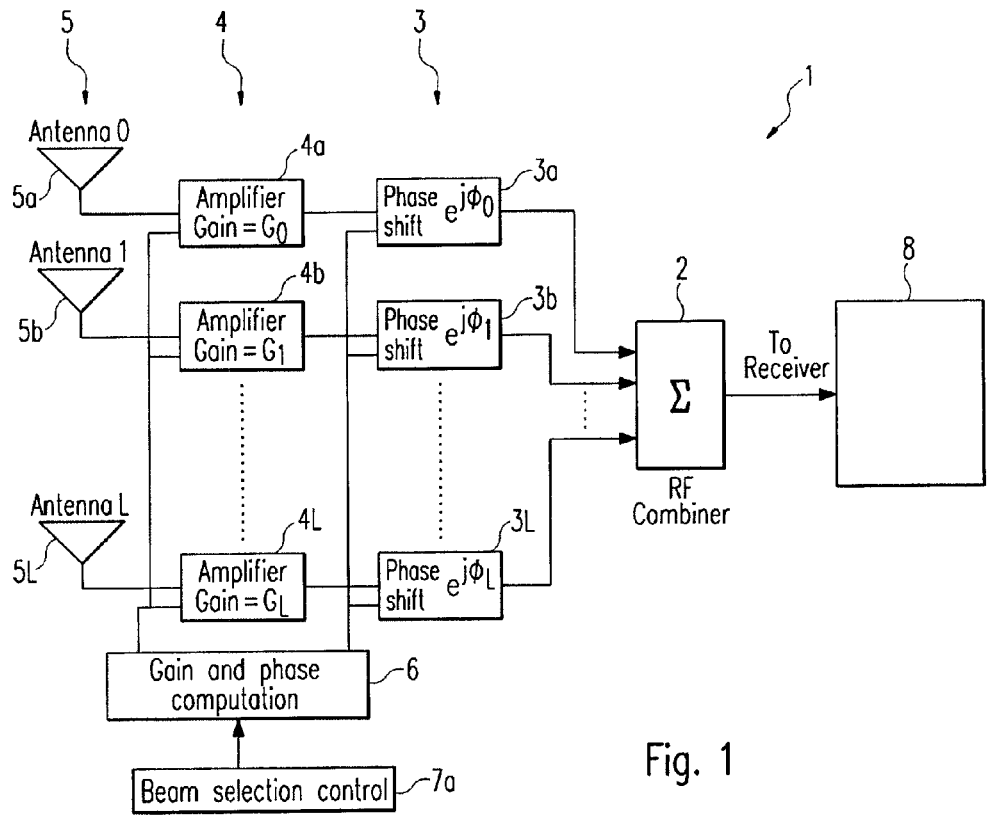

Many communication systems use antenna beams (or adaptive beam forming) for radio communication systems to increase the signal to noise ratio (SNR). Alternatively if interference is present, antenna beams would typically be used to increase the signal to interference plus noise ratio (SINR) by increasing the wanted signal power and/or decreasing the power of the unwanted interference.

The challenge, however, is how to analyze, determine and/or select the best beam combination for a given transmitter/receiver pair.

First of all, a plurality of antenna beam combinations can exist which need to be tested. If it is assumed that the beam arrangement at the transmitter and receiver has Q possible beams each, which leads to Q different radiation patterns each, the total number of possibilities for the transmitter/receiver pair is $Q^2$. This means that even for small antenna arrays with limited number of possible radiation patterns, the total number of possible combinations for a given transmitter/receiver pair can be very large and the time needed to test all of these combinations one by one, known as the 'brute force' approach, would be excessively long.

Furthermore, there exists a plurality of characteristics of a signal link for each antenna beam combinations. The question is how are the characteristics measured and processed, which characteristics are used and why and finally how are the characteristics evaluated.

Thus, the present invention relates to a method which analyses the characteristics of the received signal and selects the best beam arrangement for a transmitter/receiver pair for a given situation in a communication system.

BACKGROUND OF THE INVENTION

The US Patent 2007/0205943 A1 and the IEEE 802.15.3c standard contributions "mm Wave Beam forming" and "mm Wave Multi-Resolution Beamforming" respectively propose beam forming methods whereby antenna training is achieved, by sending or receiving test signals, where for each test signal the phases of the phase shifters in the antenna array corresponds to a column or row of an unitary matrix. By sending or receiving sufficient test signals to cover all the rows or columns of the unitary matrix the receiver can calculate the optimum settings for the phase shifters. Such a calculation utilises the special properties of the unitary matrix which simplifies calculating the matrix inverse. An unitary matrix is an orthogonal matrix of a subset of beam positions, whereby the matrix is a complex matrix comprising complex values.

The IEEE 802.15.3c standard contributions "Robust and Highly Efficient Beamforming Procedures for 60 GHz WPAN~Beam Searching and Tracking~" and "Beamforming" propose a beam forming method which has multiple stages, whereby in each stage finer beam widths are used to send test sequences to determine the best transmitter/receiver beam combination. The first stage of the method therefore strives to determine from which sector the best antenna combination for the transmitter and receiver is located. Subsequent stages use this information to determine the search areas for finer and narrower beams.

A drawback of state of the art beam forming methods using the unitary matrix approach is, that for antenna arrangements which have a low number of antennas (e.g. less than 8), there are some issues with orthogonally of the rows and columns of the unitary matrix when some antenna elements are not functioning as expected.

Furthermore, if the link performance or quality of the selected beam forming arrangement degrades, there are no alternative arrangements provided by the unitary matrix approach.

Other drawbacks of state of the art beam forming methods are based on decreasing the beam width with each step:

First, for optimum performance in some situations, the best radiation pattern which leads to best link performance may not be one with only one angular peak, but maybe one with multiple angular peaks. An example of this is when the transmitter and receiver are located in a small room and the line of sight transmission path is blocked. In such a scenario, it may be advantageous to transmit the signal simultaneously via multiple separate walls, which requires a radiation pattern with multiple angular peaks. Due to the 'zooming in' aspect of this approach, only a beam with one angular peak can be selected with this approach.

Second, when the best optimum fine beam is located between two coarse beams, there will sometimes be an error in selecting the wrong coarse beam in an early step. This ultimately leads to a non optimum fine beam being selected in a subsequent steps and results in degraded link performance.

EP 189 2852 A1 discloses an approach to determine received beams by sending a number of test sequences corresponding to the number of fundamental beams.

At the end, it is an object of the present invention to reduce the required effort to calculate and acquire the best beam arrangement between a receiver and a transmitter.

SUMMARY OF THE INVENTION

The present invention relates to a method for analyzing a channel delay profile of at least one signal link within a communication system between one or more transmitters and one or more receivers, wherein each transmitter and each receiver comprise a plurality of predetermined transmitter and receiver beams, respectively, and wherein each signal link corresponds to a specific combination of transmitter and receiver beams, whereby the method comprises an evaluation step for evaluating the at least one signal link based on characteristics of the channel delay profile.

Favorably, the evaluation step is repeatedly performed to reevaluate the current signal link.

Favorably, the method comprises a selection step for selecting a signal link based on the evaluation step.

Favorably, the method comprises a calculation step for calculating an evaluation value for each signal link based on the characteristics of the channel delay profile, said evaluation value is a result of the step of evaluating.

Favorably, the method comprises a memorize step for storing at least one evaluation value according to their highest rank in the transmitter and/or receiver.

Favorably, in case the evaluation value of the current signal link is reduced, a signal link with the next highest evaluation value is selected.

Favorably, in case the evaluation value of the current signal link is reduced, at least one signal link with the next highest evaluation value is selected and the respective evaluation value is recalculated.

Favorably, the evaluation of the at least one signal link depends on the signal power, the signal to noise ratio, the carrier to interference ratio, the line of sight ratio, the channel window size and/or the estimated channel delay spread of the channel delay profile.

The present invention is also considering an analyzing apparatus adapted to analyze a channel delay profile of at least one signal link between one or more transmitters and one or more receivers, wherein each transmitter and each receiver comprise a plurality of predetermined transmitter and receiver beams, respectively, and wherein each signal link corresponds to a specific combination of transmitter and receiver beams, the analyzing apparatus comprising an evaluation device adapted to evaluate the at least one signal link based on characteristics of the channel delay profile.

Favorably, the evaluation device is adapted to repeatedly evaluate the current signal link.

Favorably, the apparatus comprises a selection device adapted to select a signal link based on the evaluation by the evaluation device.

Favorably, the apparatus comprises a calculation device adapted to calculate an evaluation value for each signal link based on the characteristics of the channel delay profile, said evaluation value is a result of the evaluation by the evaluation device.

Favorably, the apparatus comprises a memory adapted to store at least one evaluation value according to their highest rank.

Favorably, in case the evaluation value of the current signal link is reduced, the selection device selects a signal link with the next highest evaluation value.

Favorably, in case the evaluation value of the current signal link is reduced, the selection device selects at least one signal link with the next highest evaluation value and the calculation device recalculates the respective evaluation value.

Favorably, the evaluation of the at least one signal link depends on the signal power, the signal to noise ratio, the carrier to interference ratio, the line of sight ratio, the channel window size and/or the estimated channel delay spread of the channel delay profile.

Favorably, the analyzing apparatus is part of the transmitter and/or of the receiver.

SHORT DESCRIPTION OF THE FIGURES

Figure 2:
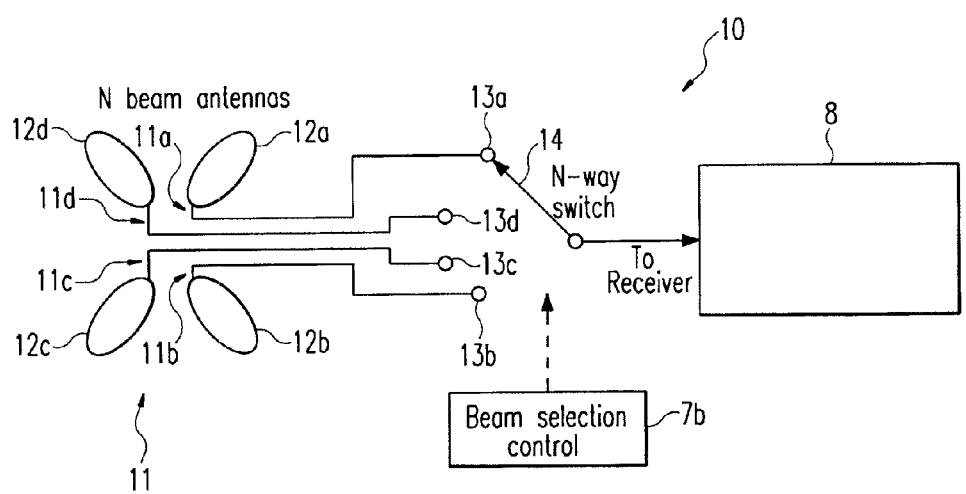
Figure 3:
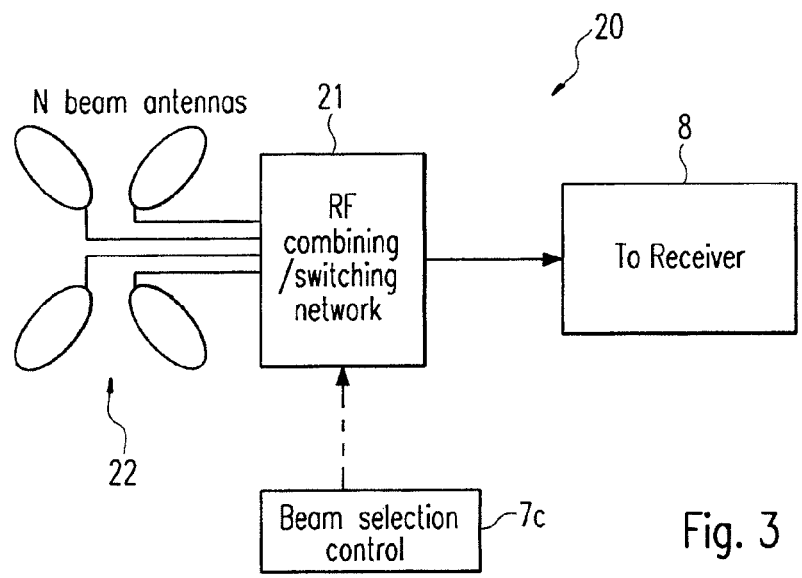
Figure 4:
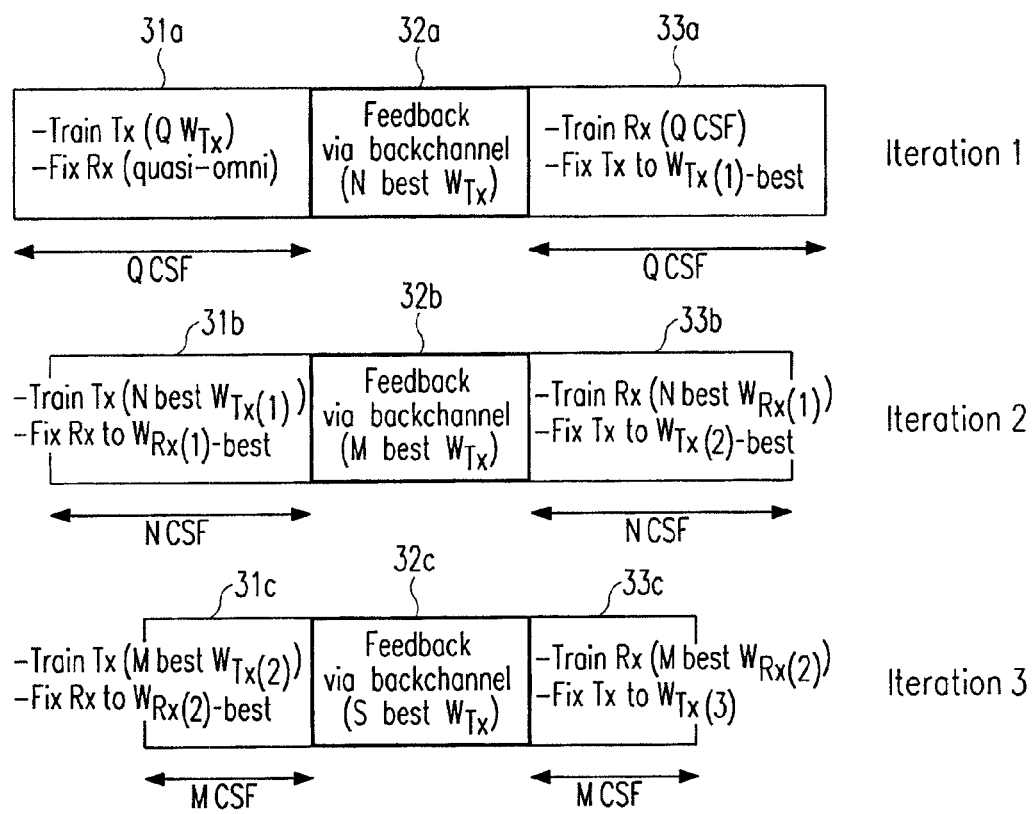
Figure 5:
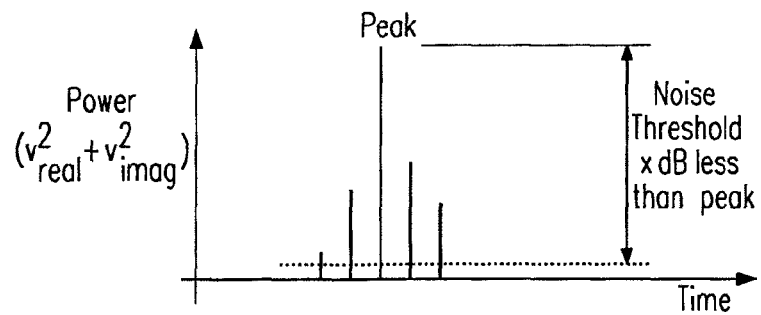
Figure 5:
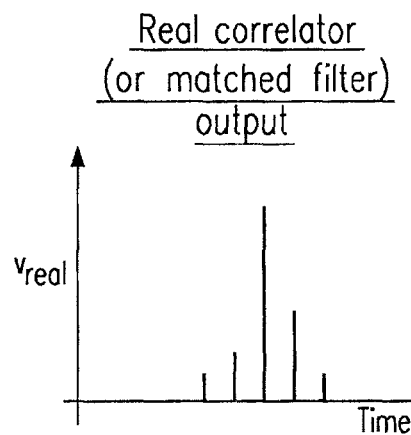
Figure 5:
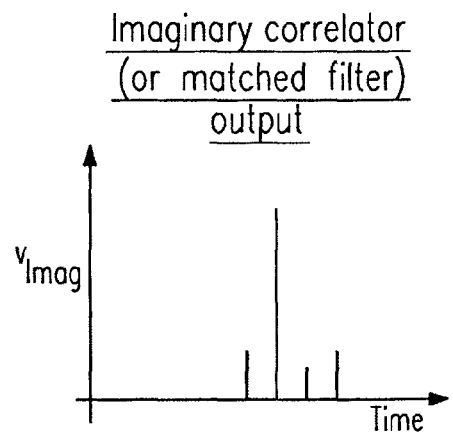
Figures 6, 7:
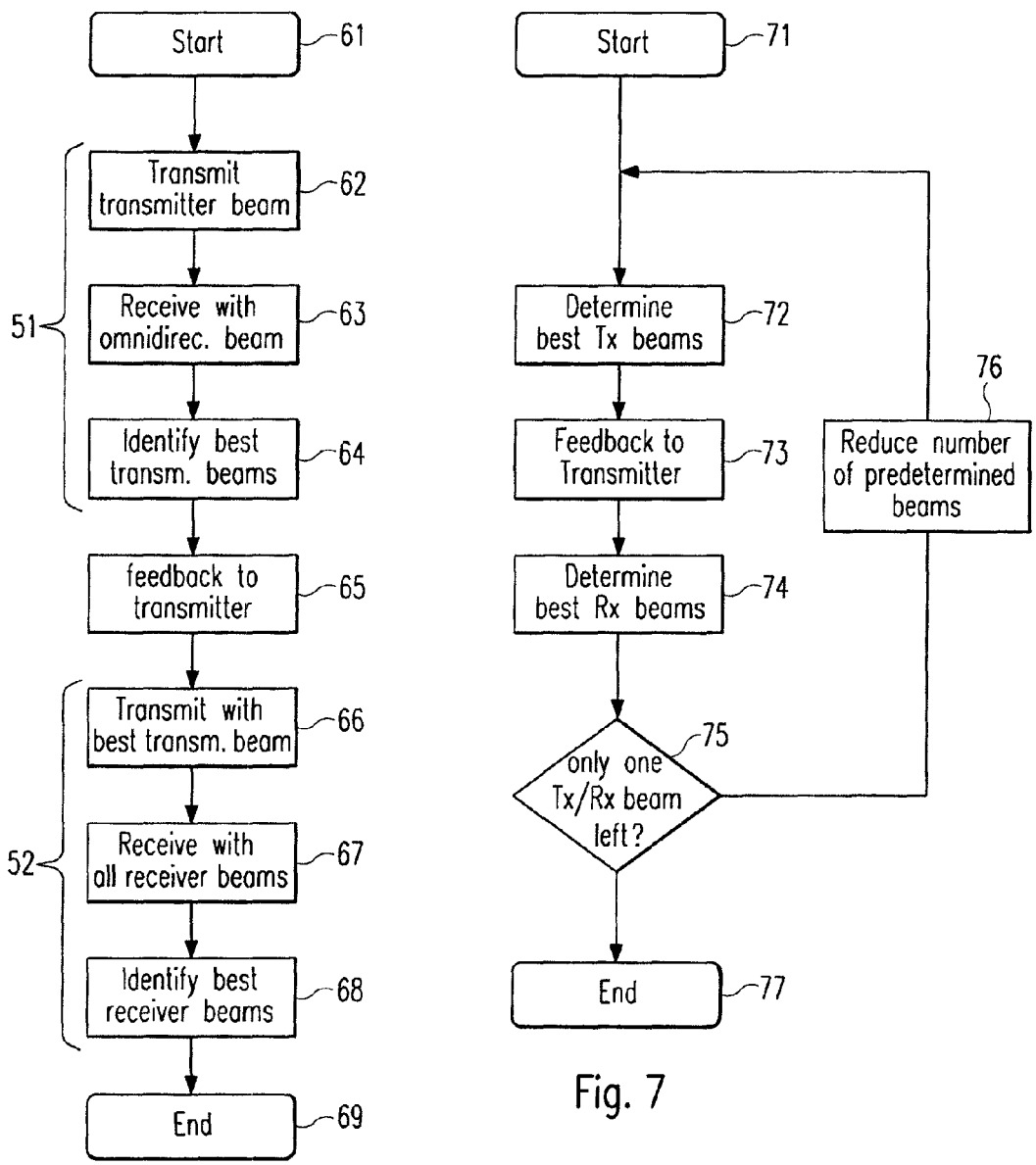
Figure 8:
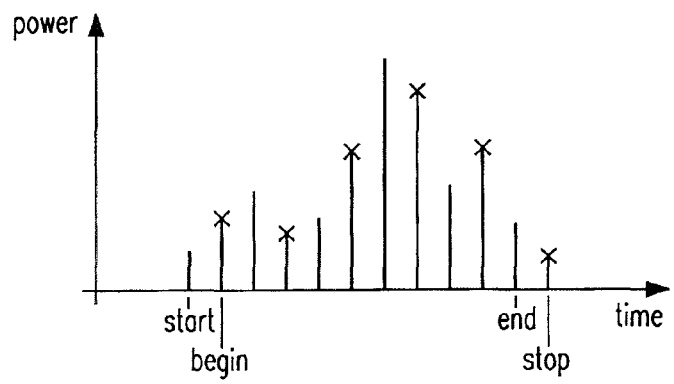
Figure 9:
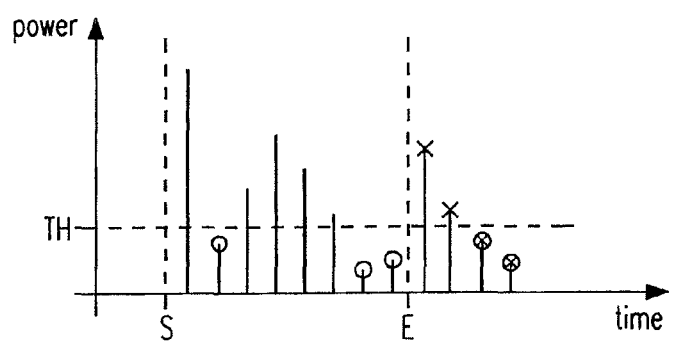
Figure 10:
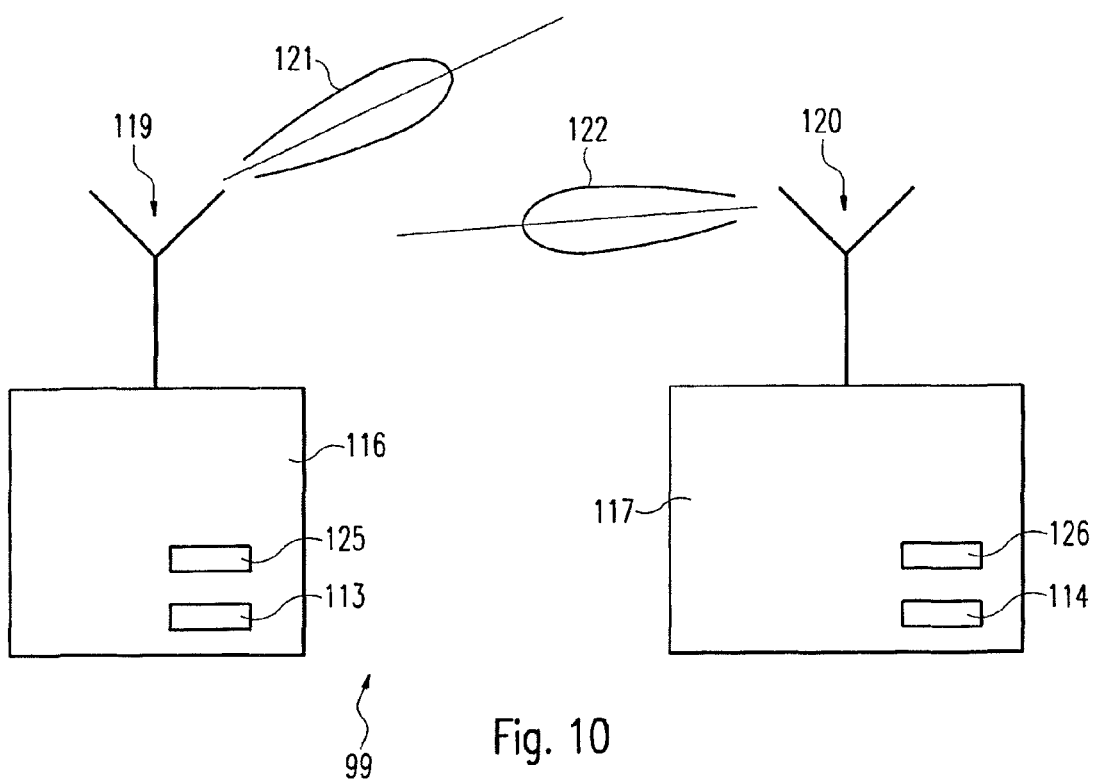

The embodiments of the present invention described by the present invention will become clearer in view of the following figures, wherein FIG. 1 shows an example of a beam forming arrangement utilizing adaptive beam forming, FIG. 2 shows another example of a beam forming arrangement utilizing fixed beam switching, FIG. 3 shows another example of a beam forming arrangement utilizing beam combining, FIG. 4 shows an example of a beam forming method using three iterative steps suitable for a system with one transmitter and one receiver, FIG. 5 shows an example of an estimated channel delay profile obtained at a receiver, FIG. 6 shows a flow chart of a beam selection method, FIG. 7 shows another flow chart of a beam selection method, FIG. 8 shows another example of an channel delay profile which is down-sampled, FIG. 9 shows another example of an channel delay profile which comprises a filter window, and FIG. 10 shows a schematic block diagram of a communication system of the present invention.

DETAILED DESCRIPTION OF THE INVENTION

This invention relates to beam selection method for a transmitter/receiver pair for communication systems which uses antenna beams.

In particular specific criteria are employed to support the selection process. For example, certain measurements are made on the estimated channel delay profile at the receiver for each of the different antenna combinations or also called antenna beam arrangement. A combination is defined by a specific directional transmitter beam and/or a specific directional receiver beam establishing a link or at least allowing measuring the presence of the respective beam.

The delay spread shown by the channel delay profile is a type of distortion that is caused when an identical signal arrives at different times at its destination. The signal usually arrives via multiple paths and with different angles of arrival. The time difference between the arrival moment of the first multipath component, typically the Line of Sight component, and the last one, is called delay spread.

The results of the measurements for each antenna combination are weighted and processed in a certain way to form a soft value or also called evaluation value, representing the expected performance of that combination, arrangement or alternatively called signal link. The combination with the highest soft value is then typically used for data transmission.

Additionally, the soft values of at least one or of all antenna combinations are stored at the receiver and/or at the transmitter in a memory unit as a ranked list. If the chosen link for final transmission experiences a sudden reduction in link quality, the beams can quickly be switched to the next beam combination which has the next highest values in the list.

In case one of the lists is updated or altered, the transmitter and the receiver synchronize with each other to keep the lists updated.

Alternatively tracking can be performed, which involves re-testing a set of beam combinations with the highest values in the list, which update their soft values and then uses the beam combination with the latest highest value for final data transmission.

This invention can also use iterative steps to determine and calculate the best beams for a transmitter and receiver pair in a communication system to provide the best communication link, whereby the transmitter and receiver are trained one at a time in each iterative step as shown in FIG. 4. The best link is favourably identified and evaluated by the characteristics of the channel delay profile of an antenna beam combination. In case of a plurality of transmitters and receivers, favorably each of them is separately trained. In case the transmitter and the receiver respectively comprise more than one antenna, the antennas can be separately trained one by one.

But to reduce the number of combinations of such a transmitter or receiver, a specific or a limited number of radiation patterns generated by the antennas of the transmitter or the receiver can be preselected and used during the iterative step.

The basic approach for establishing a communication link uses one adaptive beam antenna at the transmitter and one adaptive beam antenna at the receiver.

A particular feature of the method with the iterative step is that in each successive iterative step, the number of candidate beam combinations for the transmitter and receiver are reduced, which thereby decreases the overall time needed to find the best combination. By candidate beam combinations, the plurality of predetermined antenna beams of an iterative step is meant.

Another feature of the method with the iterative step is the usage of receiver and/or transmitter diversity. This diversity may take the form of spatial and/or polarisation diversity. Now it should be clear, that an antenna beam might originate from a single directional antenna or is the result of several transmitting or receiving antennas interfering with each other like e.g. phased-array antennas.

In a first iterative step a number of test sequences is sent which corresponds to the complete set of possible beams (or radiation patterns). For each sent test sequence, the transmitter uses a different beam. The receiver then makes decisions as which of these test signals were the best favourably based on the characteristics of the channel delay profile and sends this information to the transmitter via a back channel. The transmitter then sends the same number of test signals using the best beam as identified by the receiver and examines which of the receiver beam combinations would be the best also according to the channel delay profile. The number of sent test signals can also depend on the number of transmitter or receiver beams. In subsequent iterative steps, the number of tested beams and corresponding transmitter and receiver test sequences is reduced and the accuracy of the best transmitter/receiver antenna beam combinations is improved.

It is important to note that favorably no unitary matrix is used and in the first iterative step test sequences are sent corresponding to the complete set of all possible beams (or radiation patterns) of the transmitter and receiver, respectively.

From one iterative step to the next one, the beam width of the transmitter and/or receiver beam is favorably not reduced, but merely the number of beams or radiation patterns to be tested is reduced. In another case, after a specific number of possible transmitter/receiver beams or combinations is left, the beam width can be reduced.

In the following, the different methods for creating the antenna beams at the transmitter and receiver are described. These methods are referred to as "adaptive beam forming", "fixed beam switching" and "beam combining" and are shown in the respective FIGS. 1 to 3. It is important to note that the use of the invention is not restricted to using these methods and is applicable to beams formed by other methods apart from the above mentioned 'brute force' approach.

"Adaptive beam forming" typically uses a combination of fixed antenna branches, wherein the antennas favorably have omnidirectional characteristics and where each branch has a corresponding RF phase shifter and amplifier. The antennas could also comprise directional antennas.

FIG. 1 shows an example of a beam forming arrangement 1 utilizing fixed beam switching; in particular a receiver with L antenna branches is shown.

The arrangement 1 comprises an antenna 5, an amplifier 4, a phase shifter 3 and a RF combiner 2. In addition the amplifier 4 and the phase shifter 3 are connected to a gain and phase computation device 6 which is eventually connected to a beam selection control 7*a*. The RF combiner 2 is connected to the receiver 8.

Actually, the antenna 5 comprises a plurality of single antennas 5*a*, 5*b* to 5*l*. The amplifier 4 comprises the single amplifiers 4*a*, 4*b* to 4*l*. And the phase shifter 3 comprises a plurality of single phase shifters 3*a*, 3*b* to 3*l*.

By changing the phase shifter for each branch, the angle of received signal for which the combined L branches has the highest gain is changed and therefore the received beam can be steered. By changing the amplifier gain for each branch, the weight of the individual branches in the combiner is changed and therefore the exact beam receiver sensitivity against angle can be changed. If only a certain set of the beams needs to be used for "adaptive beam forming", the exact gain and phases required for the different branches can be computed on-line or stored in a look up table like in the gain and phase computation device 6; and these beams can then be selected.

The single antenna 5*a* is connected to the amplifier 4*a* which is in turn connected to the phase shifter 3*a*, whereby said phase shifter 3*a* is connected to the RF combiner 2. This connection between the antennas, amplifiers and phase shifters is the same for each single antenna 5*a* to 5*l*, amplifier 4*a* to 4*l* and phase shifter 3*a* to 3*l*, whereby each phase shifter 3*a* to 3*l* is respectively connected to the RF combiner 2.

The RF combiner 2 operates to receive all signals from the antennas 5*a* to 5*l* previously processed by the respective amplifier and/or phase shifter and combine them to a single output signal which is sent to the receiver 8. The antennas 5*a* to 5*l* operate respectively to receive electromagnetic signals and provide them to the respective amplifiers 4*a* to 4*l*. In another case, the antennas 5*a* to 5*l* can rotate, move and/or are directional; but favorably the antennas are omni-directional and the creation of a special radiation pattern is necessary. The amplifiers 4*a* to 4*l* operate to amplify or attenuate the received signals. The phase shifters 3*a* to 3*l* operate to change the phase or induce a phase shift to the received and amplified signal and output the signal to the RF combiner 2. The receiver 8 itself operates to receive the signal from the RF combiner 2 and process and demodulate this signal.

The gain and phase computation device 6 operates to respectively control each of the amplifiers 4*a* to 4*l* and the phase shifters 3*a* to 3*l*. Due to this operation of the device 6, different receiver beams can be selected and generated which can differ in direction and/or intensity. As mentioned above, the device favorably stores the settings of specific receiver beams in a table or another storage device, which thus can be selected by the beam selection control 7*a*.

For a transmitter, a similar arrangement as shown in FIG. 1 is used but in that case the signals travel from right to left and the RF combiner is replaced by a power splitter. Furthermore, instead of a receiver 8 a transmitter is used. The transmitted signal is split to the different antennas 5*a* to 5*l* instead of being combined.

An alternative approach to form a beam at the receiver or transmitter is to perform the phase shifting and different amplification for the different antennas branches in baseband.

FIG. 2 shows another example of a beam forming arrangement 10 utilizing fixed beam switching.

For this method, one of the N fixed beam antennas is connected to the receiver or alternatively to a transmitter via a switch. The N fixed beam antennas favorably comprise different radiation patterns or beams.

This arrangement 10 comprises an antenna 11 and a n-way switch 14, which is connected via the respective connection points 13*a* to 13*d* to the respective single antennas 11*a* to 11*d* of the antenna 11. The single antennas 11*a* to 11*d* operate to generate the antenna beams 12*a* to 12*d*, respectively. The n-way switch 14 is also connected to the receiver 8 and is controlled by a beam selection control device 7*b*. By controlling the n-way switch 14, the different antennas 11*a* to 11*d* can be selected one at a time.

All devices shown in FIG. 2 like the receiver 8 and the beam selection control device 7*b* are similar to the devices shown in FIG. 1. But due to the fact that the antennas 11*a* to 11*d* can only be selected separately, the antenna beams 12*a* to 12*d* in FIG. 2 are directional ones.

A variation of the "fixed beam switching" approach is the "beam combining" approach shown in FIG. 3. For this variation, again, N fixed beam, antennas with different radiation patterns are used, but the beam antennas can be selectively switched and RF combined yielding a higher number of possible radiation patterns.

For the standard beam selection arrangement using N fixed beam antennas (FIG. 2), there are N different radiation patterns (1 for each beam), whereas for the same number of fixed beam antennas, the beam combining arrangement (in FIG. 3) yields a total of $2^N-1$ active radiation patterns.

FIG. 3 shows another example of a beam forming arrangement 20 utilizing beam combining and switching.

The arrangement 20 comprises an antenna 22, an RF combining/switching network 21, a receiver 8 and a beam selection control device 7c. The antenna 22, the beam selection control device 7c and the receiver 8 are similar to the antenna 11, the beam selection control 7b and the receiver 8 of FIG. 2, respectively.

The RF combining network 21 operates to combine different antennas and thus their beams, so that different antennas simultaneously transmit and/or receive and a specific beam is generated. Eventually, the signals received by the different antennas are combined in a special way, so that constructive or destructive interference is achieved in a specific direction.

FIG. 4 shows an example of a beam forming method using three iteration steps suitable for a system with one transmitter and one receiver.

The first, second and third iteration comprise each a transmitter training burst 31a, 31b, 31c, a feedback burst 32a, 32b, 32c and a receiver training burst 33a, 33b, 33c, respectively. These bursts can also be time slots, respectively. The example shown uses 3 iterative steps, but of course any number of iterative steps can be used.

Between the time slots, there could be empty or specially marked time slots to avoid signal collisions or provide signal or process synchronization. The special time slot can also be inserted after every test signal.

As shown in FIG. 4, after each iteration the number of predetermined antenna beams to be used is reduced; therefore, the number of antenna beams used in the transmitter training burst 31a (Q CSF) is larger than the number of antenna beams used in the transmitter training burst 31b (N CSF). This is the same for the receiver training burst 33a (Q CSF), which is larger than the number of antenna beams used in the receiver training burst 33b (N CSF). Formula wise, it can be written $S<M<N<Q$, whereby each of the letters S, M, N, Q is a natural number and stands for a number of beams to be tested during its own iteration.

The feedback burst favorably maintains the same length in each iteration as shown in FIG. 4. In another case, the smaller the number of predetermined antenna beams gets, the less information needs to be sent back to the transmitter and the smaller the feedback burst can get as well (not shown).

The transmitter sends a test signal using the complete set of directional antenna beams during the transmitter training burst of the first iteration, while the receiver is set to a constant antenna beam which is favorably quasi omni-directional or completely omni-directional. A quasi omni-directional beam is almost equally distributed in space and allows a receiver to capture a signal by using this "middle" beam or any other unitable beam and thus to capture at least a part of the transmitter beam position.

In detail, the transmitter antenna is first trained by transmitting Q test sequences, in which each of the test sequences are sent with a different radiation pattern from the Q possible transmitter radiation patterns available.

The different test sequences are labeled as CSF (channel sounding frames) on the figure. The weighting vector $W_{Tx}$, shown on the figure is the vector containing all of the phase (and amplitude) needed for each antenna element to generate one of the radiation patterns, if the beam forming is performed by the method as shown in FIG. 1.

During the feedback burst, the receiver identifies the antenna beams with the best transmission quality and sends these results to the transmitter via a back channel. The results are favorably forwarded in form of an ordered list of the best transmitter possibilities. For each sent sequence the receiver de-correlates the received signal and uses the output of the de-correlator to decide the quality of each of Q test sequences sent from the transmitter.

This quality measurement may be based on the resulting estimated channel delay profile, the channel estimate, the estimated received signal to noise ratio, the estimated carrier to interference ratio or some other criteria. From these quality measurements the receiver ranks the best N received sequences and sends the corresponding ranked transmitter antenna indexes back to the transmitter via the backchannel.

This back channel may or may not use the same frequency or the same channel as the forward link.

During the receiver training burst, the transmitter selects the antenna beam with the best transmission quality while the receiver changes the antenna beam using the complete set of antenna beams. Favorably, the antenna beam with the best transmission quality is used during the receiver training burst by the transmitter, but it can also be the case that an antenna beam with a specific transmission quality is used depending on the application the antenna beam is required for.

After the first iteration is complete, only a specific number of the best or specific antenna beams is maintained which are considered as the number of predetermined antenna beams for the succeeding iteration, in this case the second iteration. The second iteration is processed like the first iteration with the only difference that the number of predetermined antenna beams is reduced.

As can be seen from FIG. 4, subsequent iterations follow the same pattern in the sense that the number of tested radiation patterns for the transmitter training and receiver training is reduced. It is important to note that the receiver radiation pattern used during transmitter training is favorably the best receiver radiation pattern when the receiver was last trained and that the transmitter radiation pattern used during receiver training is favorably the best transmitter radiation pattern when the transmitter was last trained.

It should be clear that in another example the predetermined signal transmission qualities to be realized during the transmitter training burst and the receiver training burst from transmitter to receiver can be different.

For the final data transmission the transmitter and receiver radiation patterns are favorably set to the best radiation patterns from the latest ranked lists calculated in the final iteration for the transmitter and receiver, respectively.

The exact number of iterations needed and the reduction of tested sequences (and corresponding patterns) from one iteration to the next is an implementation issue and may depend upon the exact communication system, the total of number of possible radiation patterns Q and the environment for which the communication systems is to be used.

The number of iterations can be a fixed number or could be varying depending upon the distribution of values in the ranked list. The iteration could also depend on an internal countdown or until only one beam of the receiver and/or transmitter is identified. The number of iterations can also depend on how fast the antenna beams are reduced with every iteration; e.g. the faster the number of beams is reduced, the smaller the number of iterations will be.

Another feature of the proposed beam selection method is that, when it is necessary for the antennas at the transmitter and receiver to be quickly re-selected during a disturbance in the channel, it is useful to use the indexes in the latest ranked lists for the transmitter and receivers to form a small set of transmitter and receiver radiation patterns which can be relatively quickly re-evaluated. This is also useful for performing tracking, which can be performed at regular interval for updating the ranking of the list.

Favorably, the receiver maintains its own ranked list of the best receiver beams and the list will be updated every iteration. This list can comprise either the complete set of predetermined antenna beams or a small selection of said beams. While the receiver preferably comprises a list of its own antenna beams, it can also comprise information of the other receivers and/or transmitters. This can also correspond to a transmitter having a list of its own antenna beams.

The basic concept presented here can also be expanded when multiple antenna are used at the transmitter and receiver. For example, the number of transmitter and receiver antennas is set to 2. It could also be the case, that two independent transmitters and two independent receivers are used in this example. It could be that each transmitter would need two different transmitter beams, when the receivers are spatially apart or independent.

Generally when $N_T$ separate antennas or beams are used at the transmitter to perform transmit diversity, each iteration will contain $N_T$ transmitter training bursts or time slots which will be used to train the different transmitters. Likewise, when $N_R$ separate antennas or beams are used at the receiver to perform receiver diversity, each iteration contains $N_R$ receiver training bursts or time slots which will be used to train the different receiver antennas. In some implementations, where multiple receivers can be used at the same time the number of transmitter training bursts or time slots in the first iteration maybe be reduced, since the multiple receivers be able to receive the initial transmitting training burst at the same time.

The challenge of the present invention, however, is how to identify the best beam combination for a given transmitter/receiver pair which leads to best performance. This performance may be quantified as, packet error rate (PER), bit error rate (BER) or some other quality measurement.

For the proposed beam selection approach, the channel delay profiles for the different beam combinations for a given transmitter/receiver pair can be obtained by different methods.

The vector h contains the complex elements ($h_{start}$, ..., $h_i$, ..., $h_{end}$) which are the complex samples passed from the channel estimation block, (typically performed by a decorrelator (or matched filter)), to subsequent processing stages. The vector j contains the elements ($j_{begin}$, ..., $j_i$, ..., $j_{stop}$) which are the complex samples from the decorrelator (or matched filter) and are not used for subsequent processing, because they have not been selected when down-sampling was used. The specific vectors will become clearer in light of equation (7) below, wherein the elements of the vector h are used for the calculation of the soft value and the elements of the vector j are not used but exist and are therefore important for the outcome of the equation (7).

The exact relationship between characteristics of the channel delay profile and the expected performance depends upon the type of system employed (single carrier, OFDM (Orthogonal Frequency Division Multiplex)), the receiver and equaliser structure, whether time and/or frequency interleaving are used, the channel coding scheme and many other system characteristics.

Therefore measurements of the channel delay profile as well as four different ways to combine the results of the measurements and calculate a soft value are described in further detail. The exact weights towards the soft value are implementation specific and depend upon the system to be used.

A channel delay profile exists for every channel and link, respectively, formed by each beam arrangement between the receiver and the transmitter and gives the intensity of a signal received through a multipath channel as a function of time delay. The time delay is the difference in travel time between multipath arrivals. The multipath channel does normally not include a single signal path but a plurality of signal paths from the transmitter to the receiver.

For Small Scale channel modeling, the power delay profile of a channel is found by taking the spatial average baseband impulse response of a multipath channel.

The 7 characteristics of a channel delay profile particular important for the present invention are as follows and can be different for every beam arrangement between the at least one transmitter and the at least one receiver:

Characteristic 1)—The received signal strength Power given by $$\text{Signal power} = \sum_{i=start}^{i=end} |h_i|^2 \quad (1)$$

Or an approximation thereof is given by $$\text{Signal power approximation 1:} \sum_{i=start}^{i=end} (\text{abs}(h_{i,real}) + \text{abs}(h_{i,imag})) \quad (2)$$

Signal power approximation 2:

$$\sum_{i=start}^{i=end} \max(\text{abs}(h_{i,real}), \text{abs}(h_{i,imag})) + \frac{1}{2}\min(\text{abs}(h_{i,real}) + \text{abs}(h_{i,imag})) \quad (3)$$

Note that $h_{i,real}$ and $h_{i,imag}$ are the real and imaginary components of the complex value $h_i$.

The approximations are used to further reduce the calculation and measurement complexity.

Characteristic 2)—The estimated received Signal to Noise Ration (SNR) is given by $$SNR = \frac{\sum_{i=start}^{i=end} |h_i|^2}{\text{noise power estimate}} \quad (4)$$

The SNR is the total power as calculated in section 1) divided by the noise power. The noise can be any kind of known noise like e.g. white noise.

Characteristic 3)—The estimated Carrier to Interference (C/I) ratio is given by $$C/I \text{ ratio} = \frac{\sum_{i=start}^{i=end} |h_i|^2}{\text{Interference power estimate} + \text{noise power estimate}} \quad (5)$$

The C/I ratio is the total power divided by the sum of the noise power and the interference power. The interference can originate from e.g. a neighbouring foreign transmitter like in a cellular system or any other system sending signals at the same time and/or the same frequency.

Characteristic 4)—The estimated Line of Sight (LOS) ratio is given by $$LOS\ ratio = \frac{\max_{i=start\ ...\ end}(|h_i|^2)}{\sum_{i=start}^{i=end}|h_i|^2} \quad (6)$$

The highest peak is usually the signal going directly in the line of sight from the transmitter to the receiver.

In case an object blocks the LOS or the LOS signal is attenuated, another path might provide the highest peak. The closer the height of the measured peak is to the height of the ideal LOS peak, the more similar the signal path of the measure peak is to the signal path of the expected LOS peak. Typically, the LOS signal is the first received signal of the channel delay profile because it has the shortest path; but it is not necessarily the strongest signal due to scattering and attenuation.

Characteristic 5)—The ration of useful peak/missed peak is given by $$ratio\ of\ useful\ peak/missed\ peak = \frac{\max_{i=start\ ...\ end}(|h_i|^2)}{\max_{i=begin\ ...\ stop}(|j_i|^2)} \quad (7)$$

The useful samples are the ones which are considered to be relevant for the determination of the soft value and are probably also above a specific threshold value. The useful peak is the useful sample which has the highest value as described in equation (7). The missed samples are for example samples which are below a specific threshold value, whereby the threshold value may be dependent upon a noise power estimate or maybe a fixed value. Alternatively, missed samples may be samples which are not used due to down-sampling. The missed peak is the missed sample which has the highest value as described in equation (7).

FIG. 8 shows an example of a channel delay profile of a signal link with multipath propagation, whereby the signal link is formed and established by one beam arrangement. The profile itself comprises 12 samples, wherein every second peak has a cross at its tip and is called a missed sample. These crossed peaks are the ones not relevant for the determination of the soft value and are not used in this example due to down-sampling. Other rates of down-sampling, like for example every third peak has a cross, are possible, depending on the calculation reduction and the quality of the calculation result.

The first useful sample is at the position 'start', the first missed sample is at the position 'begin' and the last useful sample is at the position 'end', while the last missed sample is at the position 'stop'. Due to the possibilities how to identify and determine the useful and missed sample, the positions of the 'start'/'end' markers do not necessarily depend on the position of the 'begin'/'stop' markers and vice-versa. They should merely explain that the indices in the equation (7) are not necessarily the same.

FIG. 9 shows another example of a channel delay profile with multipath propagation comprising samples flagged at their tip with a cross, with a circle, with a cross and a circle or without anything. Signal samples below the power level TH are marked with a circle and signal sample outside the area defined between the markers S (Start) and E (End) have a cross. Signal samples outside the area and below the power level have both a cross and a circle. The other signal samples are considered to be relevant and are called the useful samples. All other samples are considered as the missed samples. An upper power level could exist to filter erroneously measured peaks which would flag the signal peaks rising above said level to be not relevant.

The power level TH can depend on the noise power estimate or is predetermined before the procedure. Or the power level can also be set so that only a specific number of signal peaks are still not flagged.

The position of the markers S (Start) and E (End) can also depend on a specific peak value or is predetermined. The marker S (Start) can be placed before the first peak, normally the LOS peak, right before the highest signal peak or anywhere in the channel delay profile. The position of the marker E (End) is either identical to the position of the marker S (Start) or is placed timely after the marker S (Start). The distance between the two markers can be constant or predetermined. Also the marker E (End) has similar requirements to its placement like the marker S (Start): it can be placed before the last signal peak or is placed in such a way that only a specific number of peaks are relevant within the area; thus taking also in account the result of the power level TH. In the current example, only 5 of 8 peaks within the window are useful peaks. The other 3 peaks within the window and 4 peaks outside the area are missed peaks.

The preparation of the profile by the window can be considered as pre-processing before the actual calculation of the characteristics and/or of the soft value. The window influences the characteristics of a channel delay profile which is important for the later explained soft value calculation.

Note that for the reduction of the number of multiplication operations, the numerator and denominator of equation (4) or (5) or (6) or (7) can also be approximated by using one of the power approximations described in the equations (2) and (3).

Characteristic 6)—The estimated channel delay spread is given by $$Estimated\ channel\ delay\ (in\ samples) = \sqrt{\frac{\sum_{i=start}^{i=end}|h_i|^2 \cdot i^2 - i_0^2}{\sum_{i=start}^{i=end}|h_i|^2}} \quad (8)$$

$$Where\ i_0\ is\ the\ mean\ delay\ defined\ by\ i_0 = \sqrt{\frac{\sum_{i=start}^{i=end}|h_i|^2 \cdot i^2}{\sum_{i=start}^{i=end}|h_i|^2}} \quad (9)$$

Eventually, the estimated channel delay spread indicates how fast the channel delay profile decays.

Various alternative methods with lower complexity may also be used to estimate the multipath delay spread. As commonly known, the term 'estimate', rather means the calculation of the specific characteristic based on some measurements.

Characteristic 7)—The 'Channel window size' is defined by the equation 'end—start' of the channel delay profile. Signal samples outside this window are not considered for further processing as shown in FIG. 9.

Of course, other parameters and characteristics can be defined and be used to further refine the measurement and the calculation procedure and thus, the final result of the soft value.

Note that the noise power estimate and the interference power estimate may be respectively measured (in equations 4 and 5), calculated and achieved in different known ways and originate from different systems like for example single carrier or multicarrier systems.

Typically, the characteristics of the sections 1), 2) and 3) should all have a positive weight on the final soft value. Exactly which one of these is to be used depends upon whether the system is noise or interference limited.

The LOS ratio should also have a positive influence on the final soft value, however the exact weight depends whether an equaliser is used and how effective the equaliser is at equalising any multi-path. For receivers which have no equalisers, the LOS ratio would have a much stronger weight on the final soft value. For receivers with very effective equalisers the weight of the LOS ratio in the final soft value would have a much reduced weight and may only have a weight after the LOS ratio reaches a certain value.

The channel window size is particularly important for systems which have a block transmission structure which have a guard interval. This guard interval may be filled with a cyclic extension of the data symbols, a common word, or zeros. Examples of such systems are OFDM or SC/FDE (Frequency Domain Equaliser) systems. For such systems to be able to equalise the multi-path components in the channel, the multipath delay spread must be less than the length of the guard interval. Therefore when the channel window is longer than the guard interval, the final soft value is set to zero.

The ratio of the useful peak to the missed peak is particularly important for systems which are sending time domain signals and for which the receiver timing and receiver equalisation have different sampling rates.

An example of this is an SC/FDE system which use two times oversampling for timing and one times oversampling for the equaliser. For such systems when the ratio of the useful peak to the missed peak is close to 1, the timing will move from the useful to the missed peak, causing the performance to be degraded. Therefore when this ratio is below a certain threshold the soft value is also set to zero.

The estimated channel delay spread is important for systems which can gain from the extra diversity provided by extra multipath components. Examples of such systems are systems with time interleaving and powerful channel coding and/or spread spectrum (or CDMA systems) with a Rake receiver.

In the following, four different soft value combination procedures (SCP) to calculate the soft value from the above measurements and characteristics for each beam combination are described as examples.

First SCP:

```
IF ( ((channel window size) > length_1) OR ((Ratio of useful
peak / missed peak) < min_ratio) )
{
    Soft value = 0.0;
}
ELSE
{
    IF (LOS ratio < TH1)
    {
        Soft value = SNR * TH1
    }
    ELSE
    {
        Soft value = SNR * ((LOS ratio – TH1) * W1 + TH1)
    }
}
```

If the 'channel window size' is larger than length_1 or the 'Ratio of useful peak/missed peak' is smaller than min_ratio, then the soft value is set to zero. If both conditions are not met, and if the 'LOS ratio' is smaller than TH1, the soft value is set to the value of 'SNR' multiplied by TH1. If both conditions are not met, and if the 'LOS ratio' is equal or larger than TH1, the soft value is set to the value 'SNR' multiplied by the term '(LOS ratio−TH1)*W1+TH1'.

The first SCP is favourably used for communication systems which have equalisers which operate in semi-static environments and wherein the performance does not increase with increasing multipath.

Second SCP:

```
IF ( ((channel window size) > length_1) OR ((Ratio of useful
peak / missed peak) < min_ratio ) OR (LOS ratio < TH1) )
{
    Soft value = 0.0;
}
ELSE
{
    Soft value = SNR;
}
```

If the 'channel window size' is larger than length_1 or the 'Ratio of useful peak/missed peak' is smaller than min_ratio or the 'LOS ratio' is less than TH1, then the soft value is set to zero. If all three conditions are not met, the soft value is set to the value of 'SNR'.

The second SCP is favourably used for systems with no equaliser.

Third SCP:

```
IF ( ((channel window size) > length_1) OR ((Ratio of useful
peak / missed peak) < min_ratio) )
{
    Soft value = 0.0;
}
ELSE
{
    IF (estimated channel delay spread < TH1)
    {
        Soft value = SNR * TH1;
    }
    ELSE
    {
        Soft value = SNR * ((estimated channel delay
        spread – TH1) * W1 + TH1)
    }
}
```

If the 'channel window size' is larger than length_1 or the 'Ratio of useful peak/missed peak' is smaller than min_ratio, then the soft value is set to zero. If both conditions are not met, and if the 'estimated channel delay spread' is smaller than TH1, the soft value is set to the value of 'SNR' multiplied by TH1. If both conditions are not met, and if the 'estimated channel delay spread' is equal or larger than TH1, the soft value is set to the value of 'SNR' multiplied by the term '(estimated channel delay spread−TH1)*W1+TH1'.

The third SCP is favourably used for systems which have equalisers and may operate in dynamic environments whereby the performance improves with increasing multipath.

Fourth SCP:

```
IF ( ((channel window size) > length_1) OR ((Ratio of useful
peak / missed peak) < min_ratio) )
{
    Soft value = 0.0;
}
ELSE
{
    IF (channel window size < TH1)
    {
        Soft value = SNR * TH1;
    }
    ELSE
    {
        Soft value = SNR * ((channel window
size – TH1) * W1 + TH1)
    }
}
```

If the 'channel window size' is larger than length_1 or the 'Ratio of useful peak/missed peak' is smaller than min_ratio, then the soft value is set to zero. If both conditions are not met, and if the 'channel window size' is smaller than TH1, the soft value is set to the value of 'SNR' multiplied by TH1. If both conditions are not met, and if the 'channel window size' is equal or larger than TH1, the soft value is set to the value of 'SNR' multiplied by the term '(channel window size–TH1) *W1+TH1'.

The fourth SCP is favourably used for systems similar to the ones used in the third SCP, but instead of the estimated channel delay spread the window size is used as a low complexity measurement of the channel dispersion.

Throughout all the four above mentioned SCP especially the following statements apply:

The variables length_1, min_ratio, TH1 and W1 are all implementation parameters and can depend on the system, the environment and/or the application. They may be constant or they may be updated by the system during an initialisation and/or an update phase. They may also be updated during the ongoing SCP. TH1 is different to the TH of FIG. 9.

The 'SNR' parameter can also be replaced by the 'C/I ratio' or by the 'signal power' depending upon the system, the environment and/or the application.

For systems for which the timing and equalisation are at the same sampling rate, the test ((Ratio of useful peak/missed peak)<min_ratio) in the first IF statement can be deleted.

There are of course other possibilities and the general concept of analyzing the estimated channel delay profile for each of the beam combinations to produce a soft value which can be used for any different type of soft value calculation.

Note that the first IF condition is comparable with a pre-processing of the channel delay profile and is the first border that the channel delay profile is accepted for further processing. Otherwise the soft value is just set to zero indicating that the signal link of the beam arrangement is of poor signal quality.

The second IF condition refines the evaluation of the signal link and mostly sets the soft value to 'SNR' or to an value based on 'SNR' and further parameters.

Actually, the soft value is based on the characteristics of the channel delay profile according to the various SCP. In other examples, the soft value can be calculated based on the spread of the channel estimation samples.

As mentioned above, the soft values of all antenna combinations can be stored in a table as a ranked list. This list may also be stored at the transmitter additionally or supplementary. If the chosen link for final transmission experiences a sudden reduction in link quality, the beams can quickly be switched to the next beam combination which has the next highest value in the list. This is achieved by the receiver informing the transmitter which antenna beam it should use.

An alternative strategy is that when the chosen link experiences a sudden reduction in link quality, a tracking procedure is performed. This involves re-testing a set of transmitter/receiver beam combinations which have the highest values in the list. The latest soft values for these combination then overwrites the corresponding older values in the table and the beam combination with the highest value is used for final data transmission.

The main advantage of the beam selection scheme compared to the state of the art is that here a beam antenna combination choice is made based on the channel delay profile. Since the channel delay profile has a direct effect on the performance (depending upon the type of the receiver), by selecting suitable criteria, the beam combination with the highest performance can be easily identified and selected.

Furthermore, if the chosen link for final transmission experiences a sudden reduction in link quality, the beams can quickly be switched to the next beam combination which has the next highest values in the list. Alternatively tracking can be performed by retesting a set of beam combinations with the highest values in the list.

A typical estimated channel delay profile obtained at the receiver, typically from the output of a complex decorrelator, is shown in FIG. 5. The real and imaginary outputs are shown along with the power delay profile. Depending upon the sampling rate of the correlator or the matched filter and the rate of any subsequent processing like for example equalisation, the samples may or may not be down-sampled for subsequent processing. To reduce the effects of the noise, typically received samples which are XdB below the peak are set to zero.

FIG. 5 shows three diagrams of a channel delay profile. The upper diagram is the measured power profile, and the left and the right diagram below the upper diagram are the output of real correlator and the imaginary correlator, respectively. The power values, also called absolute square of v, of the upper diagram equal to the square of the real value $v_{real}$ of the left diagram plus the square of the imaginary value $v_{imag}$ of the right diagram.

In the upper diagram a noise filter window is applied which is placed from the highest peak and is specific value x dB less than the peak. So all values below this window are filtered out, which originate favourably from any kind of noise source.

FIGS. 6 and 7 respectively show examples how the antenna beams and there beam arrangements are identified during a beam selection method and how this result is used in the beam selection and forming process.

FIG. 6 shows a flowchart of a beam selection method which comprises the start step 61, the 'transmitter beam determination' step 51, the feedback step 65, the 'receiver beam determination' step 52 and the end step 69. The 'transmitter beam determination' step 51 comprises the 'transmit transmitter beam' step 62, the 'receive with omni-directional beam' step 63 and the 'identify best transmitter beams' step 64, while the 'receiver beam determination' step 52 comprises the 'transmit with best transmitter beam' step 66, the 'receive with all receiver beams' step 67 and the 'identify best receiver beams' step 68.

Eventually, the flowchart in FIG. 6 shows how an iteration like in FIG. 4 is executed. In step 62, the transmitter transmits a test signal into all possible antenna beam directions. In step 63, the receiver is set to an omni-directional beam and receives all the transmitter beams if possible. And in step 64, the receiver identifies the transmitter beam with the best transmission quality of the test signal. The receiver can identify the test signal, since the test signal is marked as such a signal. Or the test signal comprises information or a signal pattern which allows the receiver to directly or indirectly identify the test signal as such. For example the pattern within the test signal is already programmed into the receiver and helps the receiver to recognize the test signal.

Furthermore, the receiver can identify the antenna beam, since the test signal comprises an index or something similar to identify the antenna beam. Another possibility is that the receiver and the transmitter are synchronized and that the receiver is aware in which sequence and at what time the transmitter uses a specific antenna or antenna beam direction.

These identified transmitter beams are then sent back to the receiver via feedback in step 65. This can be done by a wireless signal channel or a wire or a cable from the receiver to the transmitter.

In step 66, the transmitter is set to the best transmitter beam which has been previously identified by the receiver in step 64. In step 67, the receiver is going through all antenna beams and receives the transmitted test signal from the transmitter. In step 68, the receiver identifies the best receiver beam by identifying the best transmission quality of the received test signal. In step 69, the flowchart ends and so does one iteration. Afterwards, when the next iteration starts, the whole flowchart starts from the beginning.

FIG. 7 shows another flowchart of a beam selection method. This flowchart comprises the steps 71, 72, 73, 74, 75, 76 and 77. After the start step 71, the flowchart continues to the step 72 wherein the transmitter beams with the best transmission quality between the transmitter and the receiver are determined. Eventually, step 72 is similar or can correspond to the step 51 of FIG. 6.

Then, the step 72 continues to step 73 which is similar to the step 65 of FIG. 6. Then the flowchart continues to step 74, wherein the best receiver beams are determined, whereby step 74 is similar or can correspond to the step 52 of FIG. 6.

After these three steps 72 to 74, the iteration is over and the process continues to the decision step 75 wherein e.g. the number of transmitter beams and/or receiver beams is controlled. If only one receiver and/or transmitter beam is left, the flowchart ends at step 77. Otherwise the flowchart goes to step 76, wherein the number of predetermined beams is reduced based on the quality of the transmission signal. Then the flowchart continues to step 72 and repeats this loop until the condition of the decision in step 75 is met. There exist different examples wherein different kinds of decisions are asked at step 75 to stop the loop and end the flowchart, thus the iterations.

FIG. 10 shows a communication system 99 for wireless communication, wherein the system 99 comprises a transmitter 116 and a receiver 117.

The transmitter 116 comprises a transmitter antenna 119, a memory 125 and an analyzing device 113. The transmitter 116 is adapted to transmit electromagnetic signals via the antenna 119, favorably by a directional antenna transmitter beam 121.

The receiver 117 comprises a receiver antenna 120, a memory 126 and an analyzing device 114. The receiver 117 is adapted to receive electromagnetic signals via the antenna 120, favorably by a directional antenna receiver beam 122.

The analyzing device 113 and 114 are respectively adapted to analyze the channel delay profile and its characteristics of the signal link established by the antenna arrangement of the antenna transmitter beam 121 and antenna receiver beam 122, evaluate the signal link based on the characteristics and store the results of the evaluation as evaluation value in the respective memory 125 and 126. Of course, the analyzing device 113, 114 and 115 can also select the antenna beam based on the evaluation value. Typically, the signal link is better the higher the evaluation value is.

The memories 125 and 126 are respectively adapted to store the evaluation values in a table, favorably ordered in a ranked list. The evaluation value points to the beam arrangement, the specific utilized transmitter and receiver beams and further parameters to reconstruct the beam arrangement. Typically the evaluation value is a number.

In another example, only the receiver 117 comprises the memory and the analyzing device and the transmitter 110 does not contain the memory and the analyzing device.

In another case, both transmitter and receiver comprise the memory and the analyzing device and both devices are capable to transmit and receive signals, thus have a transmitting mode and a receiving mode. But only the device which is currently receiving signals and is thus in the receiving mode performs the analysis of the channel delay spread with the analyzing device.

Favorably, the memories 125 and 126 are synchronized to keep the list of the evaluation values up-to-date. So as soon as a change of an evaluation value is registered by an analyzing device, the analyzing device sends an updated list or orders the transmitter 110 or the receiver 111 to update their respective memory 125 or 126.

Or in another example, the changed evaluation value is updated in the memory of the analyzing device which detected the change, and the analyzing device orders the other unit to adapt the beam arrangement according to the updated evaluation value. Since the analyzing is favorably done during the receiving mode of the device, the other device is therefore favorably the transmitter, thus the device in the transmitting mode.

It is also possible that only one device 116 or 117 comprises an analyzing device and/or a memory for reasons of cost reduction and informs the other device which does not have an analyzing device and/or a memory.

The invention claimed is:

1. A method for analyzing a channel delay profile of at least one signal link within a communication system between one or more transmitters and one or more receivers, wherein each transmitter and each receiver comprise a plurality of predetermined transmitter and receiver beams, respectively, and wherein each signal link corresponds to a specific combination of transmitter and receiver beams, said method comprising:
   an evaluation step for evaluating the at least one signal link based on characteristics of the channel delay profile, wherein the characteristics of the channel delay profile are the signal power, the signal to noise ratio, the carrier to interference ratio, the line of sight ratio, the channel window size and the estimated channel delay spread of the channel delay profile;
   evaluating the at least one signal link by calculating soft values, which represent the expected performance of signal links, from different combinations of the above characteristics; and
   selecting the signal link with the highest soft value.

2. A method according to claim 1, wherein the evaluation step is repeatedly performed to reevaluate the current signal link.

3. A method according to claim 1,
comprising a selection step for selecting a signal link based on the evaluation step.

4. A method according to claim 1,
comprising a calculation step for calculating an evaluation value for each signal link based on the characteristics of the channel delay profile, said evaluation value is a result of the step of evaluating.

5. A method according to claim 4,
comprising a memorize step for storing at least one evaluation value according to their highest rank in the transmitter and/or receiver.

6. A method according to claim 5,
wherein, in case the evaluation value of the current signal link is reduced, a signal link with the next highest evaluation value is selected.

7. A method according to claim 5,
wherein, in case the evaluation value of the current signal link is reduced, at least one signal link with the next highest evaluation value is selected and the respective evaluation value is recalculated.

8. An analyzing apparatus adapted to analyze a channel delay profile of at least one signal link between one or more transmitters and one or more receivers, wherein each transmitter and each receiver comprise a plurality of predetermined transmitter and receiver beams, respectively, and wherein each signal link corresponds to a specific combination of transmitter and receiver beams, the analyzing apparatus comprising:
an evaluation device adapted to
evaluate the at least one signal link based on characteristics of the channel delay profile, wherein the characteristics of the channel delay profile are the signal power, the signal to noise ratio, the carrier to interference ratio, the line of sight ratio, the channel window size and the estimated channel delay spread of the channel delay profile,
evaluate the at least one signal link by calculating soft values, which represent the expected performance of signal links, from different combinations of the above characteristics, and
select the signal link with the highest soft value.

9. An analyzing apparatus according to claim 8,
wherein the evaluation device is adapted to repeatedly evaluate the current signal link.

10. An analyzing apparatus according to claim 8,
comprising a selection device adapted to select a signal link based on the evaluation by the evaluation device.

11. An analyzing apparatus according to claim 8,
comprising a calculation device adapted to calculate an evaluation value for each signal link based on the characteristics of the channel delay profile, said evaluation value is a result of the evaluation by the evaluation device.

12. An analyzing apparatus according to claim 11,
comprising a memory adapted to store at least one evaluation value according to their highest rank.

13. An analyzing apparatus according to claim 12,
wherein, in case the evaluation value of the current signal link is reduced, the selection device selects a signal link with the next highest evaluation value.

14. An analyzing apparatus according to claim 12,
wherein, in case the evaluation value of the current signal link is reduced, the selection device selects at least one signal link with the next highest evaluation value and the calculation device recalculates the respective evaluation value.

15. An analyzing apparatus according to one of the claims 8 to 14,
wherein the analyzing apparatus is part of the transmitter and/or of the receiver.

* * * * *